US010030879B2

(12) United States Patent
Okazaki et al.

(10) Patent No.: US 10,030,879 B2
(45) Date of Patent: Jul. 24, 2018

(54) REMOTE CONTROL DEVICE FOR AIR-CONDITIONING APPARATUS

(71) Applicant: Mitsubishi Electric Corporation, Tokyo (JP)

(72) Inventors: Junichi Okazaki, Tokyo (JP); Hideki Takahara, Tokyo (JP); Jiro Nakasu, Tokyo (JP); Miho Ishikawa, Tokyo (JP); Hidetoshi Hatta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 418 days.

(21) Appl. No.: 14/813,432

(22) Filed: Jul. 30, 2015

(65) Prior Publication Data

US 2016/0033156 A1    Feb. 4, 2016

(30) Foreign Application Priority Data

Aug. 1, 2014   (JP) .................................. 2014-157564

(51) Int. Cl.
G05B 21/00    (2006.01)
G01M 1/38    (2006.01)
(Continued)

(52) U.S. Cl.
CPC ............ F24F 11/006 (2013.01); F24F 11/30 (2018.01); F24F 11/62 (2018.01); G05B 15/02 (2013.01);
(Continued)

(58) Field of Classification Search
CPC ....... F24F 11/006; G05B 15/02; G08C 17/02; G08C 2201/12; G08C 2201/30
(Continued)

(56) References Cited

U.S. PATENT DOCUMENTS

2004/0121725 A1 *  6/2004  Matsui ................... G08C 17/02
                                                                455/3.06
2006/0087446 A1 *  4/2006  Kuroda .................. G08C 17/02
                                                                340/13.24
(Continued)

FOREIGN PATENT DOCUMENTS

JP        H11-316565 A      11/1999
JP        2000-333277 A     11/2000
(Continued)

OTHER PUBLICATIONS

Office Action dated Jul. 4, 2017 issued in corresponding JP patent application No. 2014-157564 (and English translation).
Extended European Search Report dated Dec. 17, 2015 in the corresponding EP application No. 15178843.7.
Office Action dated Aug. 28, 2017 issued in corresponding CN patent application No. 201510462957.2 (and English translation).
Office Action dated Nov. 28, 2017 issued in corresponding JP patent application No. 2014-157564 (and English translation).

Primary Examiner — Mohammad Ali
Assistant Examiner — Md Azad
(74) Attorney, Agent, or Firm — Posz Law Group, PLC

(57) ABSTRACT

A remote control device includes a flat, plate-like display to display a state of settings of the air-conditioning apparatus or a control command; a touch panel provided on or under the display to receive input of a control command for the air-conditioning apparatus through detection of a change in an electric signal, the change occurring when a display position of the display is touched; a transmitter to transmit to the air-conditioning apparatus a signal of the control command input through the touch panel; and a start/stop button provided at a position different from the touch panel and configured to trigger start of operation of or stop of operation of the air-conditioning apparatus.

7 Claims, 13 Drawing Sheets

(51) Int. Cl.
*G05B 13/00* (2006.01)
*G05B 15/00* (2006.01)
*G05D 23/00* (2006.01)
*F24F 11/00* (2018.01)
*G08C 17/02* (2006.01)
*G05B 15/02* (2006.01)
*F24F 11/30* (2018.01)
*F24F 11/62* (2018.01)
*F24F 11/56* (2018.01)

(52) U.S. Cl.
CPC ............... *G08C 17/02* (2013.01); *F24F 11/56* (2018.01); *G08C 2201/12* (2013.01); *G08C 2201/30* (2013.01)

(58) Field of Classification Search
USPC ........................................................ 700/276
See application file for complete search history.

(56) References Cited

U.S. PATENT DOCUMENTS

| | | |
|---|---|---|
| 2007/0046618 A1 | 3/2007 | Imai |
| 2012/0062370 A1 | 3/2012 | Feldstein et al. |
| 2015/0100167 A1* | 4/2015 | Sloo ....................... G01N 27/02 700/278 |
| 2017/0122618 A1* | 5/2017 | Yamamoto ............... F24F 11/02 |

FOREIGN PATENT DOCUMENTS

| | | |
|---|---|---|
| JP | 2001-285964 A | 10/2001 |
| JP | 2002-228239 A | 8/2002 |
| JP | 2002-243251 A | 8/2002 |
| JP | 2007-65050 A | 3/2007 |

* cited by examiner

F I G. 8
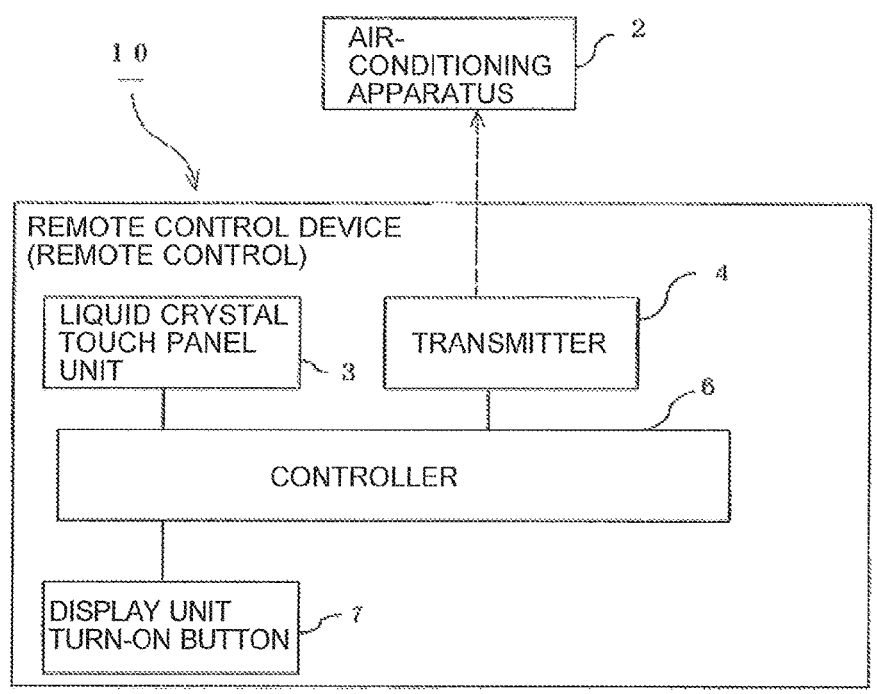

REMOTE CONTROL DEVICE FOR AIR-CONDITIONING APPARATUS

TECHNICAL FIELD

The present invention relates to a remote control device for controlling an air-conditioning apparatus at hand, and more particularly, to a remote control device provided with a touch panel.

BACKGROUND ART

Conventionally, there has been an apparatus provided with a touch panel, a microcomputer which processes information input from the touch panel, a storage device connected to the microcomputer, and an infrared LED as an output device driven to control a device to be controlled, such as an air-conditioning apparatus, as a remote control device (abbreviated as a remote control) (see, for example, Patent Literature 1).

When remote control commands are displayed on a liquid crystal screen of the touch panel and a user touches a desired control command, the microcomputer detects a touched position as an electric signal. The control command is recognized from this touched position and is output to the infrared LED, thereby the control target device is remotely controlled. The remote control device disclosed in Patent Literature 1 has only a touch panel that allows the user to input a command related to remote control, thus requires a smaller area for installation than that for a remote control device used before Patent Literature 1, which has more input buttons, and has higher durability compared to the remote control device used previously, therefore, convenient or user-friendly because the user does not have to look for an input button for control among a number of input buttons.

A remote control device with a touch panel typically uses a dry cell as a power source for powering the liquid crystal display and the microcomputer. Further, the dry cell also supplies power for energization for detecting the touched position on the touch panel.

CITATION LIST

Patent Literature

Patent Literature 1: Japanese Unexamined Patent Application Publication No. 2000-333277 (paragraphs [0037] to [0043], FIG. 1)

SUMMARY OF INVENTION

Technical Problem

In the remote control device disclosed in Patent Literature 1, the user inputs a control command only through the touch panel, and the user has to input the control command by touching the touch panel while viewing the control commands displayed on the liquid crystal screen. That is, the user has to input even control of starting operation of or stopping operation of the air-conditioning apparatus, which is the most basic control for remotely controlling the air-conditioning apparatus, while viewing display on the liquid crystal screen. While the user only needs to touch "start/stop" if the "start/stop" is displayed on the liquid crystal screen, if other control commands are displayed, the user is required to manipulate the remote control device to change the display so that the "start/stop" is displayed, which is a problem that operability of the remote control device is unfavorable.

Further, a battery mounted as a power source for the remote control device needs replacing when the battery life ends. The need of frequent replacement of the battery is troublesome and makes the user dissatisfied. Therefore, there is a desire to extend the length of the battery life.

The present invention has been made to overcome the above-described problems of the conventional apparatus, and an object of the present invention is to provide a remote control device for an air-conditioning apparatus with favorable operability, which is capable of quickly and easily starting operation of or stopping operation of the air-conditioning apparatus while taking advantage of user-friendliness of a touch panel.

Further, an object of the present invention is to provide a remote control device for an air-conditioning apparatus capable of extending the length of the battery life by saving power.

Solution to Problem

A remote control device for an air-conditioning apparatus according to the present invention includes a flat, plate-like display to display a state of settings of the air-conditioning apparatus or a control command; a touch panel provided on or under the display to receive input of a control command for the air-conditioning apparatus through detection of a change in an electric signal, the change occurring when a display position of the display is touched; a transmitter to transmit to the air-conditioning apparatus a signal of the control command input through the touch panel; and a start/stop button provided at a position different from the touch panel and configured to trigger start of operation of or stop of operation of the air-conditioning apparatus.

Further, a remote control device for an air-conditioning apparatus according to the present invention includes a flat, plate-like display to display a state of settings of an air-conditioning apparatus or a control command; a touch panel provided on or under the display to receive input of a control command for the air-conditioning apparatus through detection of a change in an electric signal, the change occurring when a display position of the display is touched; a transmitter to transmit to the air-conditioning apparatus a signal of the control command input through the touch panel; and a display turn-on button provided at a position different from the touch panel and triggering turning on the display.

Further, a remote control device for an air-conditioning apparatus according to the present invention includes a flat, plate-like display to display a state of settings of an air-conditioning apparatus or a control command; a touch panel provided on or under the display to receive input of a control command for the air-conditioning apparatus through detection of a change in an electric signal, the change occurring when a display position of the display is touched; a transmitter to transmit to the air-conditioning apparatus a signal of the control command input through the touch panel; a start/stop button provided at a position different from the touch panel and configured to trigger start of operation of or stop of operation of the air-conditioning apparatus; and a display turn-on button provided at a position different from the touch panel and the start/stop button and triggering turning on the display.

Advantageous Effects of Invention

According to the present invention, it is possible to provide a remote control device for an air-conditioning apparatus with favorable operability, which is capable of quickly and easily starting operation of or stopping operation of the air-conditioning apparatus while taking advantage of user-friendliness of a touch panel.

Further, it is possible to provide a remote control device for an air-conditioning apparatus which is capable of extending the length of the battery life by saving power.

BRIEF DESCRIPTION OF DRAWINGS

FIG. 8 is a block diagram illustrating a remote control device for an air-conditioning apparatus according to Embodiment 2 of the present invention.

DESCRIPTION OF EMBODIMENTS

Embodiment 1

Figure 1:
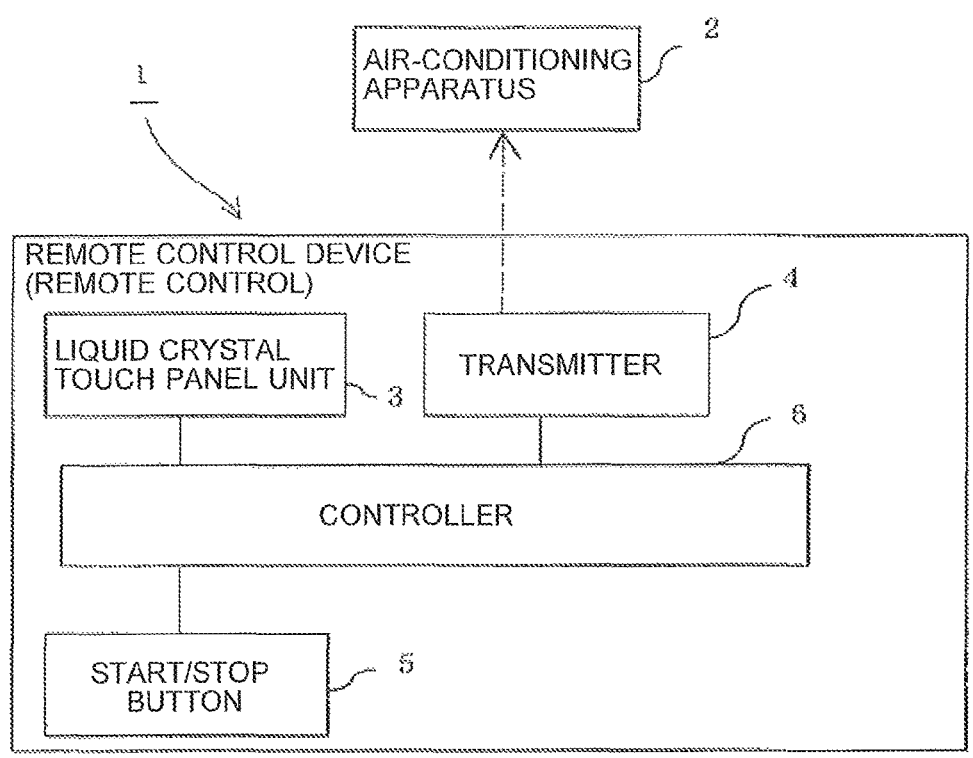
FIG. 1 is a block diagram illustrating a remote control device for an air-conditioning apparatus according to Embodiment 1 of the present invention.
Figure 2:
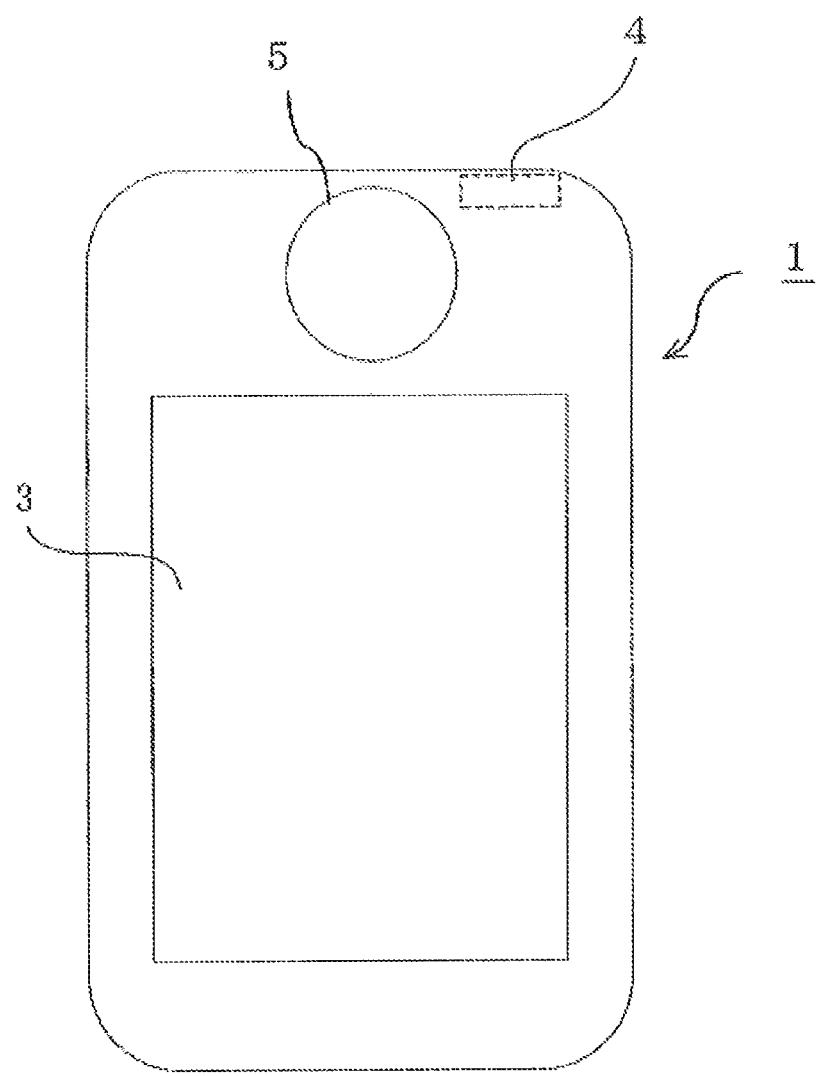
FIG. 2 is a top view illustrating the remote control device for the air-conditioning apparatus according to Embodiment 1 of the present invention.
Figure 3:
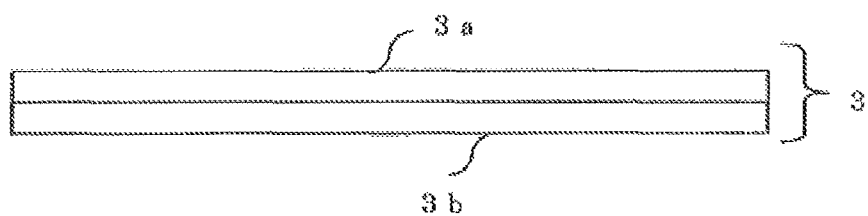
FIG. 3 is a side view illustrating a liquid crystal touch panel unit according to the remote control device for the air-conditioning apparatus according to Embodiment 1 of the present invention.

FIG. 1 is a block diagram illustrating a remote control device 1 for an air-conditioning apparatus according to Embodiment 1 of the present invention, FIG. 2 is a top view illustrating the remote control device 1, and FIG. 3 is a side view illustrating a liquid crystal touch panel unit 3 according to the remote control device 1.

An air-conditioning apparatus 2 (indoor unit) is provided on a wall face at an upper part of a room for which air is to be conditioned. A user controls the air-conditioning apparatus 2 by transmitting a control command for the air-conditioning apparatus 2 using the remote control device 1 (hereinafter, referred to as a remote control 1). The remote control 1 has a liquid crystal touch panel unit 3 which displays a state of settings, or the like, of the air-conditioning apparatus 2 on a liquid crystal screen and which allows the user to input the control command by touching a position of the displayed control command, a transmitter 4 which transmits a signal of the input control command to the air-conditioning apparatus 2, a start/stop button 5 triggering start or stop of operation of the air-conditioning apparatus 2, and a controller 6 which controls the liquid crystal touch panel unit 3, the transmitter 4, the start/stop button 5, or the like. A dry cell which is a power source is mounted to the remote control 1. A dashed arrow from the transmitter 4 to the air-conditioning apparatus 2 in FIG. 1 indicates the signal of the control command.

As illustrated in FIG. 3, the liquid crystal touch panel unit 3 has a touch panel 3a and a liquid crystal display unit 3b, and the touch panel 3a is placed on or under the liquid crystal display unit 3b which is a display unit formed with a flat, plate-like liquid crystal. While the touch panel 3a is stacked on an upper face of the liquid crystal display unit 3b here, the liquid crystal display unit 3b may be provided on an upper face of the touch panel 3a. A voltage is applied to the touch panel 3a, and, when the user touches on the control command displayed on the liquid crystal display unit 3b from the upper face of the touch panel 3a, in the remote control 1, the controller 6 detects a change in an electric signal generated when a display position of the liquid crystal display unit 3b is touched, and the transmitter 4 transmits the control command for the air-conditioning apparatus 2. The controller 6 is implemented with a control substrate provided below the liquid crystal touch panel unit 3.

FIG. 2 is a top view of the remote control 1, while the control substrate (controller 6) is not illustrated. As illustrated in FIG. 2, the remote control 1 according to Embodiment 1 has a start/stop button 5 at a position different from the liquid crystal touch panel unit 3. When the user depresses the start/stop button 5, the operation of the air-conditioning apparatus 2 is started or stopped. A signal indicating that the user depresses the start/stop button 5 is detected at the controller 6.

Because the conventional remote control has many buttons, where the user does not know the position of the buttons, it takes time to manipulate the remote control, and thus operability of the remote control is unfavorable. Therefore, the remote control which allows the user to input a control command while viewing displayed content using a touch panel as disclosed in Patent Literature 1 is easy to use and convenient or user-friendly. The remote control 1 according to this embodiment is configured such that starting the operation of or stopping the operation of the air-conditioning apparatus 2 which is the most frequent user operation, is performed through the start/stop button 5 and other principal control is operated through the liquid crystal touch panel unit 3 which is easy to use and user-friendly.

In this embodiment, in order to extend the length of the life of the battery which drives the remote control 1, when the remote control 1 is not manipulated, the liquid crystal display unit 3b of the liquid crystal touch panel unit 3 is turned off. For example, if the touch panel 3a has not been touched for a certain period (for example, approximately, 30 seconds) after the liquid crystal display unit 3b of the liquid crystal touch panel unit 3 was turned on, the controller 6 turns off the liquid crystal display unit 3b. For the touch panel 3a of the liquid crystal touch panel unit 3, however, in order to respond whenever the user manipulates the liquid crystal touch panel unit 3, it is necessary to always energize the touch panel 3a for detecting a touched position and put the touch panel 3a into an input standby state.

Figure 4:
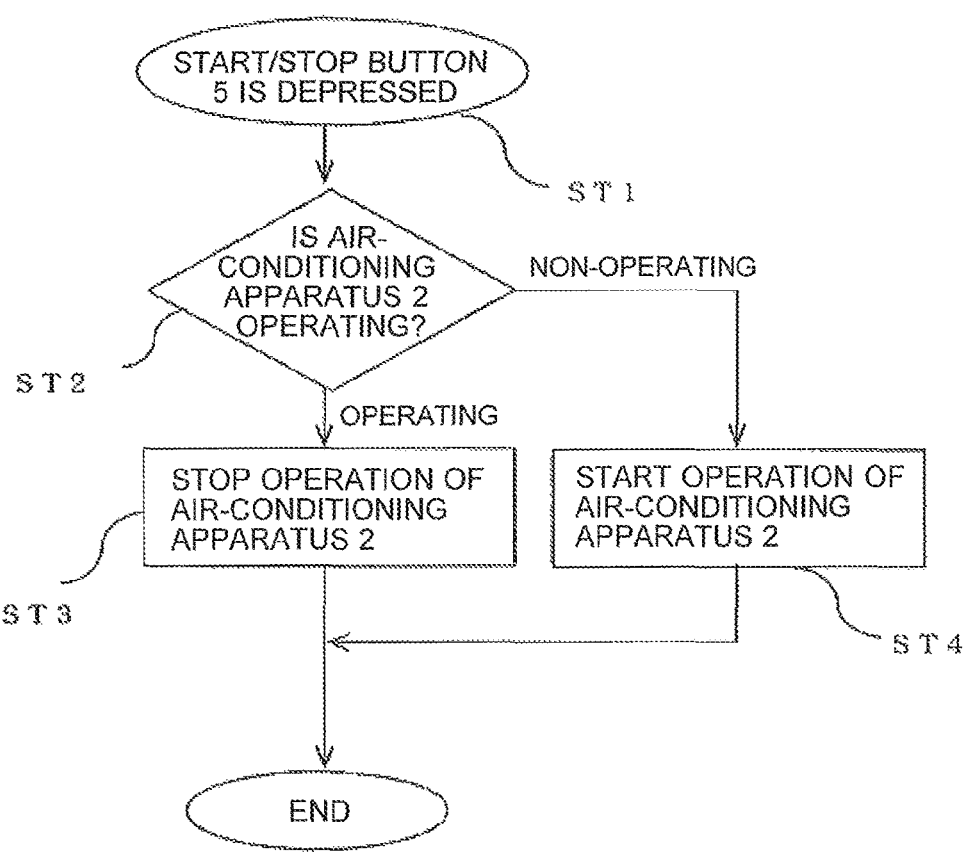
FIG. 4 is a chart illustrating flow of operation of the remote control device for the air-conditioning apparatus according to Embodiment 1 of the present invention.

Control of the start/stop button 5 will be described next. When the user depresses the start/stop button 5 while the liquid crystal display unit 3b of the liquid crystal touch panel unit 3 is turned off, the operation of the air-conditioning apparatus 2 is started or stopped. FIG. 4 is a chart illustrating an example of operation when the user depresses the start/stop button 5 of the remote control 1. Actual control is operated at the controller 6.

After the controller 6 detects that the start/stop button 5 is depressed (ST1), the controller 6 determines whether or not the air-conditioning apparatus 2 is operating in ST2. If the air-conditioning apparatus 2 is operating, the transmitter 4 transmits a signal for stopping operation of the air-conditioning apparatus 2 to the air-conditioning apparatus 2 to deactivate the air-conditioning apparatus 2 (ST3). Further, if it is determined in ST2 that the air-conditioning apparatus 2 is not operating, the transmitter 4 transmits a signal for starting operation of the air-conditioning apparatus 2 to start operation of the air-conditioning apparatus 2 (ST4).

As described above, if the user depresses the start/stop button 5, the air-conditioning apparatus 2 is activated if the air-conditioning apparatus 2 is deactivated, and the air-conditioning apparatus 2 is deactivated if the air-conditioning apparatus 2 is activated. Control for starting operation of or stopping operation of the air-conditioning apparatus 2 is most frequently performed, and the user can quickly and easily perform the control only by depressing the start/stop button 5 without manipulating the liquid crystal touch panel unit 3 when the user desires to perform the control.

While there is also a remote control which saves power by turning off liquid crystal display among remote controls which allow input of control commands only through a touch panel, with such a remote control, it is necessary to perform at least two manipulations, that is, touching the touch panel to turn on the liquid crystal display, and then touching the touch panel again while viewing a control command displayed on a liquid crystal screen. In this embodiment, it is possible to provide the remote control 1 which is easy to use because it is possible to quickly and easily start operation of or stop operation of the air-conditioning apparatus only by depression of the start/stop button 5 once.

For example, when the user comes home in summer when it is hot outdoors, the user anyhow desires to quickly start operation of the air-conditioning apparatus 2 to cool down the room. At this time, because the user does not have to view display of the liquid crystal touch panel unit 3, but only needs to depress the start/stop button 5 to start operation of the air-conditioning apparatus 2, the remote control 1 has favorable operability.

Figure 5:
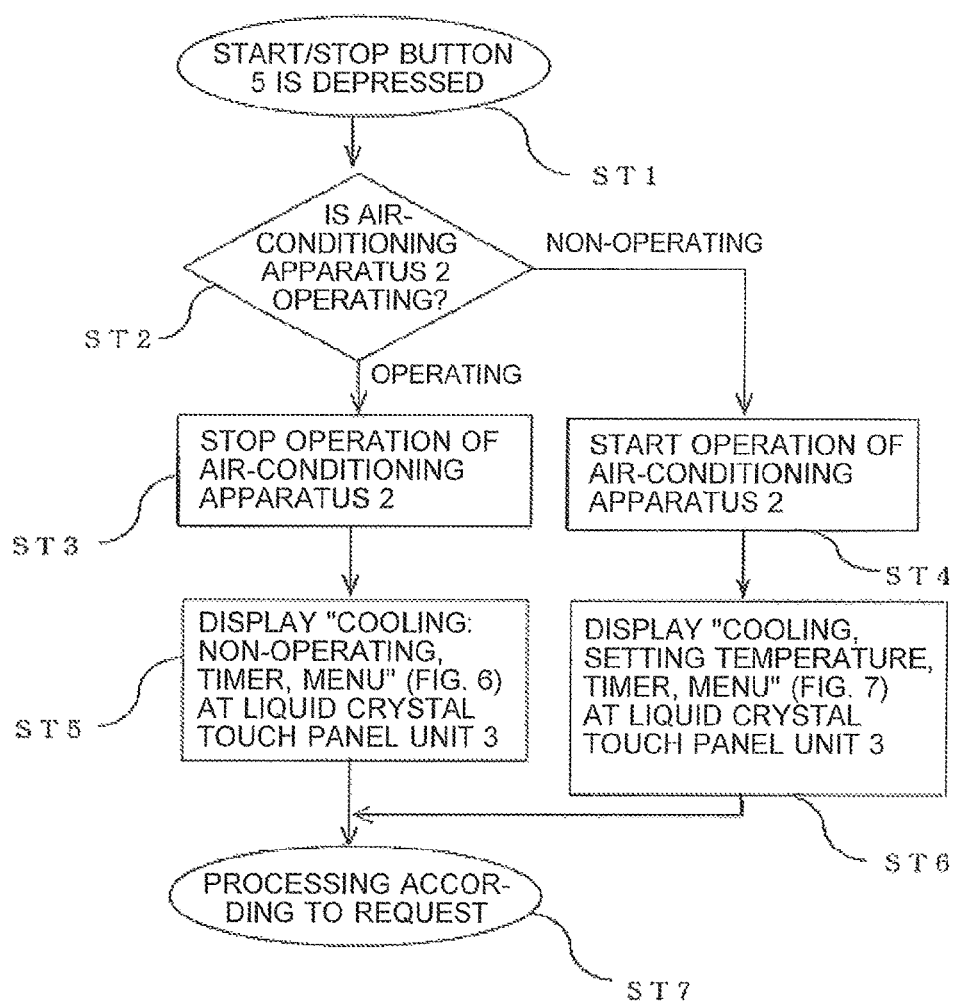
FIG. 5 is a chart illustrating flow of another operation of the remote control device for the air-conditioning apparatus according to Embodiment 1 of the present invention.

Further, when the start/stop button 5 is depressed, the controller 6 may turn on the liquid crystal display unit 3b of the liquid crystal touch panel unit 3 as well as starting operation of or stopping operation of the air-conditioning apparatus 2. FIG. 5 is a chart illustrating an example of operation of the controller 6 at this time.

Figure 6:
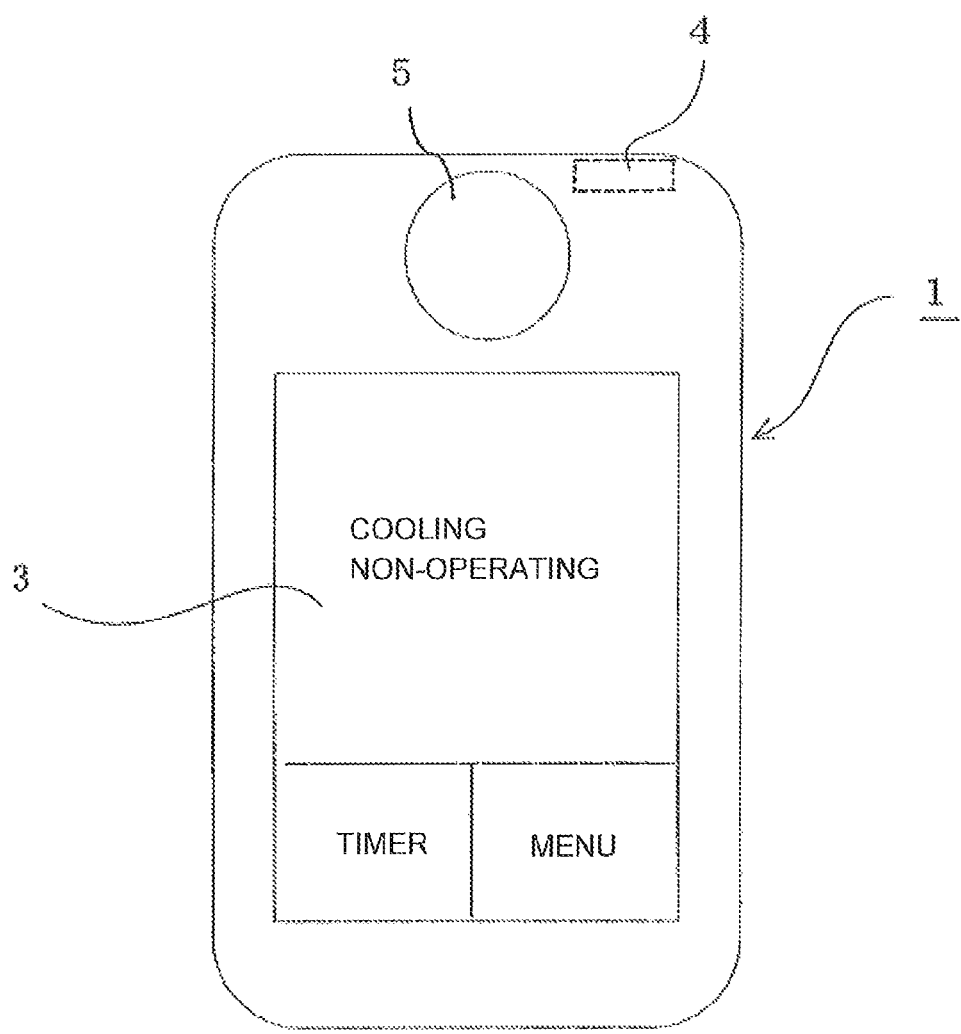
FIG. 6 is an explanatory diagram illustrating a display example on the liquid crystal touch panel unit of the remote control device for the air-conditioning apparatus according to Embodiment 1 of the present invention.

As in FIG. 4, the controller 6 detects that the start/stop button 5 is depressed by the user (ST1), and, when the air-conditioning apparatus 2 is operating, stops operation of the air-conditioning apparatus 2 (ST3). After the operation of the air-conditioning apparatus 2 is stopped, display of, for example, "cooling: not operating (state of settings)" or "timer, menu (control command)" as illustrated in FIG. 6 is provided on the liquid crystal display unit 3b of the liquid crystal touch panel unit 3 (ST5). If the touch panel 3a has not been touched for a certain period (for example, approximately, 30 seconds) after the display was provided, the liquid crystal display unit 3b is turned off. Further, processing according to control requested by the user is performed (ST7), for example, if the "timer" is touched by the user after the display is provided, timer setting is performed, or, if the "menu" is touched, the display shifts to other liquid crystal display menu for notifying the user of consumed power, or the like.

Figure 7:
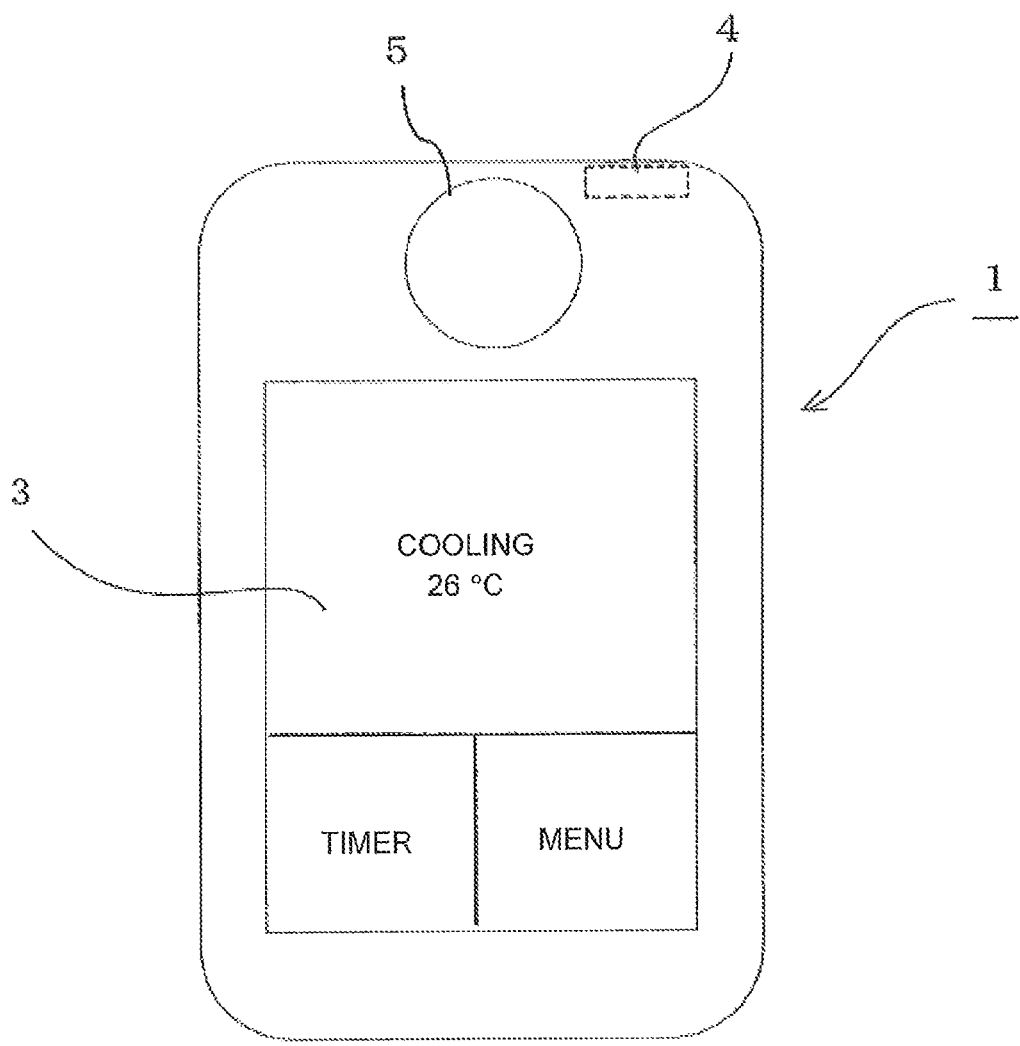
FIG. 7 is an explanatory diagram illustrating another display example on the liquid crystal touch panel unit of the remote control device for the air-conditioning apparatus according to Embodiment 1 of the present invention.

Further, if it is determined in ST2 that the air-conditioning apparatus 2 is not operating, the air-conditioning apparatus 2 is activated (ST4). After the air-conditioning apparatus 2 is activated, display of, for example, "cooling: 26 degrees C. (state of settings)" or "timer, menu (control command)" as illustrated in FIG. 7 is displayed on the liquid crystal display unit 3b of the liquid crystal touch panel unit 3 (ST6). If the touch panel 3a has not been touched for a certain period (for example, approximately 30 seconds) after the display was provided, the liquid crystal display unit 3b is turned off. Further, processing according to control requested by the user is performed (ST7), for example, if the "timer" is touched by the user after the display is provided, timer setting is performed, or, if the "menu" is touched, the display shifts to other liquid crystal display menu for changing a temperature or a direction of the airflow, or the like.

Here, the state of settings or the control command to be displayed is not limited to those illustrated in FIG. 6 and FIG. 7, and other state of settings or control commands may be displayed. Further, a layout of the display is not limited to this, and may be displayed along with current time, a temperature, or the like.

In this manner, if the user depresses the start/stop button 5 of the remote control 1, the controller 6 starts operation of or stops operation of the air-conditioning apparatus 2 and turns on the liquid crystal display unit 3b of the liquid crystal touch panel unit 3. With this configuration, the user can further perform various control after the operation of the air-conditioning apparatus 2 is started or stopped, so that it is possible to improve operability. Particularly, because the liquid crystal touch panel unit 3 is turned on along with the start of the air-conditioning apparatus 2 operating, the user can immediately perform control command for changing a temperature, a direction of the airflow, or the like, so that the remote control 1 can quickly respond to a request of the user and operability becomes favorable.

It should be noted that, in order to further improve operability of the remote control 1, the start/stop button 5 may have a noticeable color. For example, the start/stop button 5 may have a noticeable color such as yellow and orange or fluorescent color while the remote control 1 may have muted color such as white, black and gray. With this configuration, the start/stop button 5 of the remote control 1 has improved visibility, which can reduce erroneous control, so that it is possible to improve operability by the user.

In this manner, if the start/stop button 5 is depressed while the liquid crystal touch panel unit 3 of the remote control 1 is turned off, even if the liquid crystal touch panel unit 3 is not activated, it is possible to control the air-conditioning apparatus 2 by starting operation of or stopping operation of the air-conditioning apparatus 2, so that it is possible to improve operability of the remote control 1.

However, the present invention is not limited to this, and even if the liquid crystal touch panel unit 3 is turned on, or the liquid crystal touch panel unit 3 of the remote control 1 is activated, the operation of the air-conditioning apparatus 2 may be started or stopped when the start/stop button 5 is depressed. For example, when the user has to suddenly go out while he/she is manipulating the remote control 1, it is possible to forcibly stop the operation of the air-conditioning apparatus 2 by depressing the start/stop button 5, so that it is possible to improve operability of the remote control 1.

While the liquid crystal display unit 3b of the liquid crystal touch panel unit 3 is formed with a liquid crystal here, the liquid crystal display unit 3b may be formed with an organic EL display.

Further, a battery for driving the remote control 1 is not limited to a dry cell, but may include a rechargeable battery. Alternatively, power may be supplied from a power source. Power being supplied from a power source means that the remote control 1 is connected to a household outlet, or the like, and power is supplied to the remote control 1. Also in the remote control 1 to which power is supplied from a power source, in order to save power, it is possible to save power by turning off display of the liquid crystal touch panel unit 3 when the remote control 1 is not controlled. Further, in the case of the remote control 1 in which a backlight for illuminating the liquid crystal display unit 3b to make liquid crystal display more visible is provided individually from display of the liquid crystal display unit 3b, it is also possible to save power by turning off only the backlight. Of course, by turning off both the backlight and display of the liquid crystal display unit 3b, it is possible to save more power.

In the remote control 1 according to Embodiment 1, because main control input is performed at the liquid crystal touch panel unit 3, and the start/stop button 5 is provided to start operation of or stop operation of the air-conditioning apparatus 2, it is possible to quickly and easily start operation of or stop operation of the air-conditioning apparatus 2 while taking advantage of user-friendliness of manipulation through the touch panel 3b. Further, because there are only the liquid crystal touch panel unit 3 and one start/stop button 5, a configuration is simpler than that of a remote control with a number of buttons, so that the user can easily and quickly perform control.

It should be noted that while the liquid crystal touch panel unit 3 has a configuration in which the touch panel 3a is stacked on the liquid crystal display unit 3b, the touch panel 3a may be provided under the liquid crystal display unit 3b.

As described above, according to the remote control 1 of this embodiment, because the remote control 1 includes a flat, plate-like display 3b which displays a state of settings of the air-conditioning apparatus 2 or a control command, a touch panel 3a provided on or under the display unit 3b to receive input of a control command for the air-conditioning apparatus 2 through detection of a change in an electric signal, the change occurring when a display position of the display unit 3b is touched, a transmitter 4 transmitting to the air-conditioning apparatus 2 a signal of the control command input through the touch panel 3a, and a start/stop button 5 provided at a position different from the touch panel 3a and triggering start or stop of operation of the air-conditioning apparatus 2, it is possible to provide a remote control device for an air-conditioning apparatus, which is capable of quickly and easily starting operation of or stopping operation of the air-conditioning apparatus while taking advantage of user-friendliness of the touch panel.

Further, it is possible to save power required for liquid crystal display by turning off the display unit 3b if the touch panel 3 has not been touched for a predetermined period after the state of settings of the air-conditioning apparatus 2 or the control command was displayed on the display unit 3b, so that it is possible to extend the length of the battery life of the remote control 1.

Further, it is possible to quickly and easily start operation of or stop operation of the air-conditioning apparatus by starting operation of or stopping operation of the air-conditioning apparatus 2 and turning on the display unit 3b when the start/stop button 5 is depressed while the display unit 3b is turned off, so that it is possible to quickly respond to control requested by the user, which improves operability of the remote control 1.

The remote control 1 is a remote control device which is fed by a battery. In connection with this, it is possible to extend the length of the battery life and reduce frequency of replacement of the battery by turning off the display unit 3b so as to save power consumption.

Embodiment 2

Figure 9:
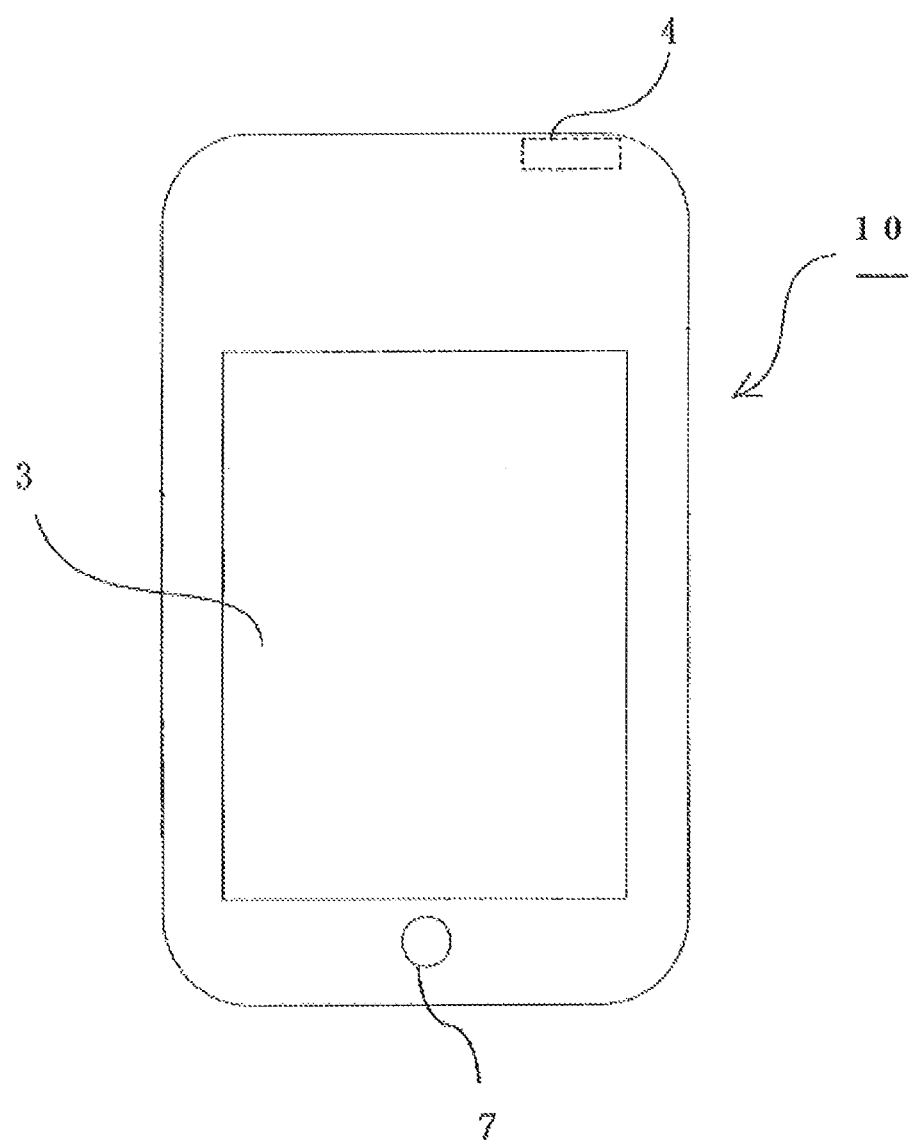
FIG. 9 is a top view illustrating the remote control device for the air-conditioning apparatus according to Embodiment 2 of the present invention.

FIG. 8 is a block diagram illustrating a remote control device 10 for an air-conditioning apparatus according to Embodiment 2 of the present invention, and FIG. 9 is a top view illustrating the remote control device 10 (hereinafter, referred to as a remote control 10). Parts assigned with the same reference numerals as those in FIG. 1 and FIG. 2 of Embodiment 1 indicate the same or corresponding parts.

The remote control 10 according to Embodiment 2 has a display unit turn-on button 7 at a position different from the liquid crystal touch panel unit 3. In this embodiment, turning on and turning off of the liquid crystal display unit 3b of the liquid crystal touch panel unit 3, and on and off of energization of the touch panel 3a are performed in conjunction with each other. That is, when the liquid crystal display unit 3b of the liquid crystal touch panel unit 3 is turned off, energization of the touch panel 3a is turned off. Hereinafter, this state will be referred to as "the liquid crystal touch panel unit 3 turned off". Meanwhile, when the liquid crystal display unit 3b of the liquid crystal touch panel unit 3 is turned on, energization of the touch panel 3a is turned on. Hereinafter, this state will be referred to as "the liquid crystal touch panel unit 3 being turned on". A signal indicating that the user depresses the display unit turn-on button 7 is detected at the controller 6.

Figure 10:
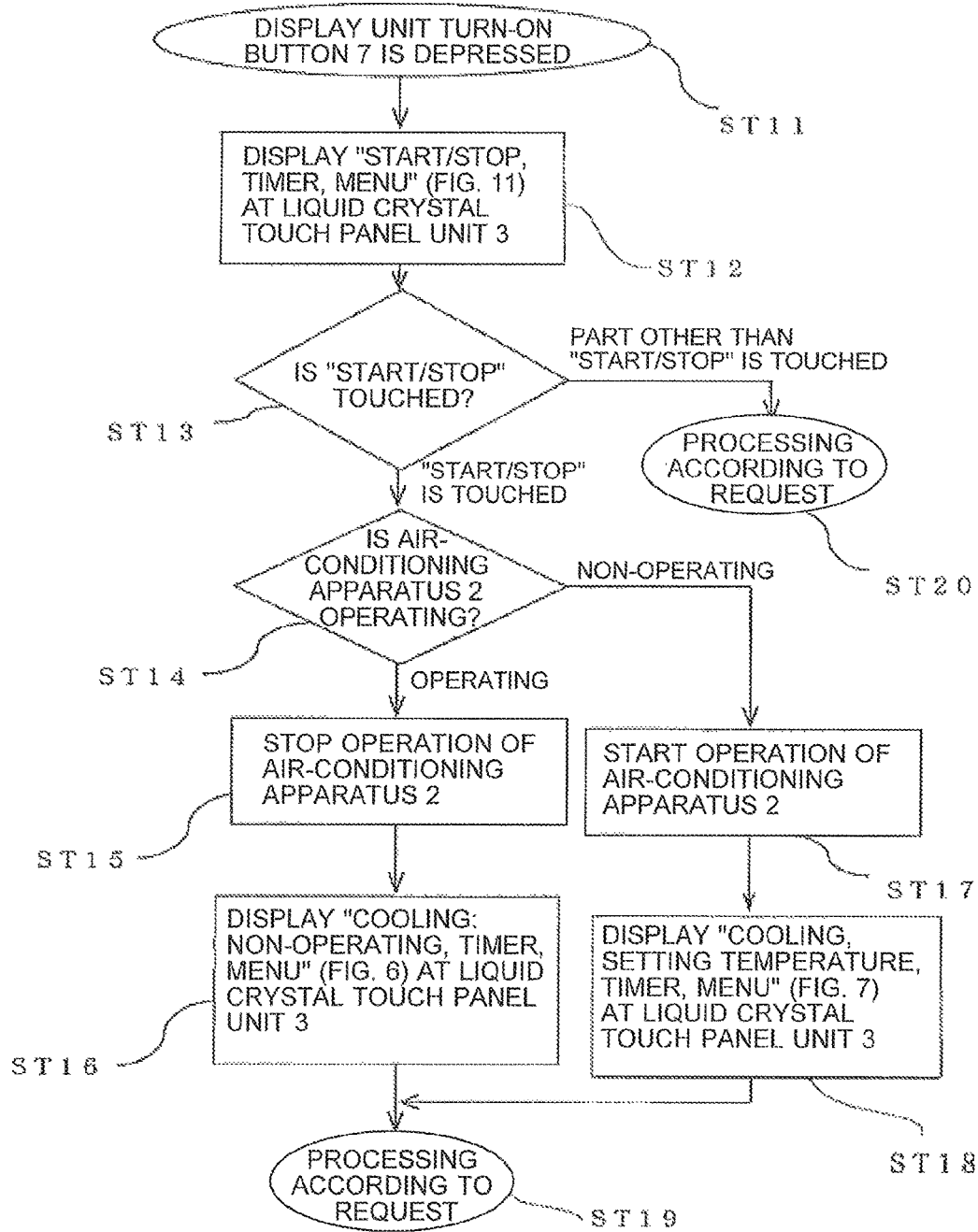
FIG. 10 is a chart illustrating flow of operation of the remote control device for the air-conditioning apparatus according to Embodiment 2 of the present invention.
Figure 11:
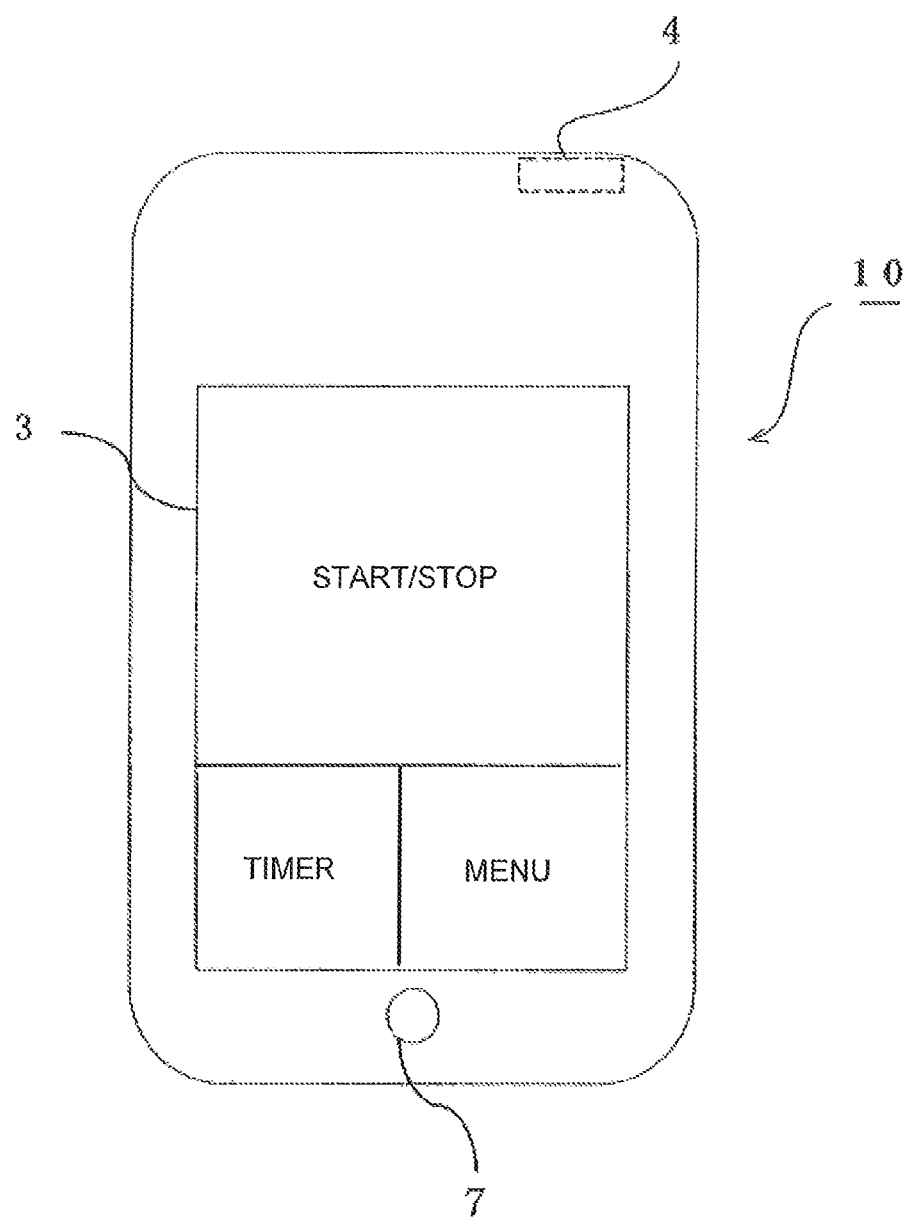
FIG. 11 is an explanatory diagram illustrating a display example on a liquid crystal touch panel unit of the remote control device for the air-conditioning apparatus according to Embodiment 2 of the present invention.

FIG. 10 is a chart illustrating an example of operation when the display unit turn-on button 7 of the remote control 10 is depressed. Actual control is operated at the controller 6. When the user depresses the display unit turn-on button 7, the controller 6 detects that the display unit turn-on button 7 is depressed in ST11, and then, turns on the liquid crystal touch panel unit 3 in ST12 and provides display of, for example, "start/stop, timer, menu (control command)" as illustrated in FIG. 11 on the liquid crystal display unit 3b. If the touch panel 3a has not been touched for a certain period (for example, approximately 30 seconds) after the display was provided, the liquid touch panel unit 3 is turned off.

If the user touches the touch panel 3a of the liquid crystal touch panel unit 3 when display as illustrated in FIG. 11 is provided, it is determined from the touched position whether or not the "start/stop" is touched (ST13). If the "start/stop" is touched, processing of "start/stop" is performed in ST14 to ST19 as with the case where the start/stop button 5 is depressed in Embodiment 1.

That is, when the operation of the air-conditioning apparatus 2 is being started, the air-conditioning apparatus 2 is deactivated in ST15. After the air-conditioning apparatus 2 is deactivated, display as illustrated in, for example, FIG. 6 is provided on the liquid crystal display unit 3*b*, and the liquid crystal touch panel unit 3 is turned on (ST16). If the touch panel 3*a* has not been touched for a certain period (for example, approximately 30 seconds) in response to this display, the liquid crystal touch panel unit 3 is turned off. Further, processing according to control requested by the user is performed (ST19), for example, if the "timer" is touched, timer setting is performed, or, if the "menu" is touched, the display shifts to other liquid crystal display menu for displaying consumed power, or the like.

Further, if it is determined in ST14 that the air-conditioning apparatus 2 is not operating, the air-conditioning apparatus 2 is activated (ST17). After the air-conditioning apparatus 2 is activated, display as illustrated in, for example, FIG. 7 is provided on the liquid crystal display unit 3*b* of the liquid crystal touch panel unit 3, and the liquid crystal touch panel unit 3 is turned on (ST18). If the touch panel 3*a* has not been touched for a certain period (for example, approximately 30 seconds) in response to this display, the liquid crystal display touch panel unit 3 is turned off. Further, processing according to control requested by the user is performed (ST19), for example, if the "timer" is touched, timer setting is performed, or, if the "menu" is touched, the display shifts to other liquid crystal display menu for changing a temperature or a direction of the airflow, or the like.

If a position other than the "start/stop" is touched in ST13, an operation state of the air-conditioning apparatus 2 is not changed, such that if the operation of the air-conditioning apparatus 2 is being started, the air-conditioning apparatus 2 is kept activated, while if the air-conditioning apparatus 2 is not operating, the air-conditioning apparatus 2 is kept deactivated. Further, processing according to control requested by the user is performed (ST20), for example, if the "timer" is touched, timer setting is performed, or, if the "menu" is touched, the display shifts to other liquid crystal display menu for changing a temperature or a direction of the airflow, or the like.

As with Embodiment 1, also in this embodiment, if the touch panel 3*a* has not been touched for a certain period (for example, approximately 30 seconds) after display was provided on the liquid crystal display unit 3*b* of the liquid crystal touch panel unit 3, the display of the liquid crystal display unit 3*b* is turned off, so that it is possible to save power required for liquid crystal display.

Further, in this embodiment, energization of the touch panel 3*a* is turned off as well as the liquid crystal display unit 3*b* is turned off, and, after the display unit turn-on button 7 is depressed, energization of the touch panel 3*a* is turned on so that the touch panel 3*a* is put into an input standby state as well as the liquid crystal display unit 3*b* is turned on. Therefore, it is possible to save power required for energization to detect a touched position on the touch panel 3*a*, so that it is possible to save more power than that in Embodiment 1, and further extend the length of the battery life.

Further, when the display unit turn-on button 7 is depressed, in the remote control 10, "start/stop" as illustrated in FIG. 11 is displayed on the liquid crystal display unit 3*b* in ST3. The user can quickly start operation of or stop operation of the air-conditioning apparatus 2 by touching the "start/stop" displayed here. It is possible to easily perform starting operation of or stopping operation of the air-conditioning apparatus 2 which is basic control that is most frequently operated when the air-conditioning apparatus 2 is remotely controlled.

Further, when the display is provided on the liquid crystal display unit 3*b* in ST12, the state of settings or the control command may be displayed along with the display in FIG. 11. For example, when the operation of the air-conditioning apparatus 2 is being started, the state of settings ("air-conditioning, 26 degrees C.") illustrated in FIG. 7 may be also displayed in part of FIG. 11. Further, when the air-conditioning apparatus 2 is not operating, the state of settings ("air-conditioning apparatus is not operating") illustrated in FIG. 6 may be also displayed in part of FIG. 11. By also displaying the state of settings and the control command, the user can not only control "start/stop", but also can confirm or change the state of settings, so that it is possible to provide the remote control 10 which is user-friendliness for the user and has favorable operability. However, the display is not limited to those in FIG. 6 and FIG. 7, and other state of settings or control commands may be displayed.

Further, the operation when the display unit turn-on button 7 is depressed is not limited to that in FIG. 10. For example, it is also possible to store the display provided before the liquid crystal display unit 3*b* is turned off and provide the stored display again. When the user has not touched the remote control 10 for a certain period (here, 30 seconds) while the user manipulates the remote control 10 because the user has something to do, for example, answers the phone or has a visitor, and the liquid crystal touch panel unit 3 is turned off, the user can immediately restart and continue the manipulation of the remote control 10 by depressing the display unit turn-on button 7.

Further, in order to further improve operability of the remote control 10, the display unit turn-on button 7 may have a noticeable color. For example, the display unit turn-on button 7 may have a noticeable color such as yellow and orange or fluorescent color while the remote control 10 may have muted color such as white, black and gray. If the display unit turn-on button 7 has a noticeable color, visibility of the display unit turn-on button 7 of the remote control 10 is improved, so that the user can recognize the button for turning on the liquid crystal display unit 3*b* at a glance. Therefore, it is possible to reduce erroneous control, which leads to improvement of operability by the user.

As described above, the controller 6 turns off the liquid crystal touch panel unit 3 when the remote control 10 is not being used, and promptly turns on the liquid crystal touch panel unit 3 through depression of the display unit turn-on button 7 to energize the touch panel 3*a* and turn on the liquid crystal display unit 3*b* when it is necessary to control the air-conditioning apparatus 2, so that it is possible to provide the remote control 10 which can save power and which has favorable operability.

It should be noted that, if the display unit turn-on button 7 is depressed while the liquid crystal touch panel unit 3 is being turned on, it is also possible to perform processing of turning off the liquid crystal touch panel unit 3. With this configuration, the user can purposely turn off the liquid crystal touch panel unit 3 to save power without waiting for a predetermined period (for example, approximately 30 seconds) after the liquid crystal display is provided.

Alternatively, while the liquid crystal display unit 3*b* of the liquid crystal touch panel unit 3 of the remote control 10 is turned on, that is, even when the liquid crystal touch panel unit 3 is turned on, the user may erroneously depress the display unit turn-on button 7. To address this, it is also possible to design the remote control 10 so that the liquid crystal touch panel unit 3 is kept turned on, if the display unit turn-on button 7 is depressed while the liquid crystal touch panel unit 3 is turned on.

With the remote control 10 according to Embodiment 2, because the main control input is operated at the liquid crystal touch panel unit 3, and the display unit turn-on button 7 is provided to turn on and off the liquid crystal touch panel unit 3, it is possible to save power while taking advantage of manipulation through the touch panel 3b. Further, because the remote control 10 has the liquid crystal touch panel unit 3 and only one display unit turn-on button 7, the configuration is simpler than that of a remote control with a number of buttons, so that the user can easily and quickly manipulate the remote control 10.

As described above, because the remote control 10 of this embodiment includes a flat, plate-like display 3b which displays a state of settings of the air-conditioning apparatus 2 or a control command, a touch panel 3a which is provided on or under the display unit 3b and through which a control command for the air-conditioning apparatus 2 is input in response to a change in an electric signal detected when a display position of the display unit 3b is touched, a transmitter 4 which transmits a signal of the control command input through the touch panel 3a to the air-conditioning apparatus 2, and a display unit turn-on button 7 which is provided at a position different from the touch panel 3a and which turns on the display unit 3b, it is possible to provide a remote control device for an air-conditioning apparatus which can save power and extend the length of the battery life while taking advantage of user-friendliness of the touch panel.

Further, because the remote control 10 turns off the display unit 3b and turns off energization of the touch panel 3a when the touch panel 3a has not been touched for a predetermined period after the state of settings of the air-conditioning apparatus 2 or control was displayed on the display unit 3b, it is possible to save power required for liquid crystal display and save power required for energizing the touch panel 3a, so that it is possible to extend the length of the battery life.

Further, if the display unit turn-on button 7 is depressed while the display unit 3b is turned off, because the remote control 10 displays a control command for starting operation of or stopping operation of the air-conditioning apparatus 2 at the display unit 3b and turns on energization of the touch panel 3b, it is possible to provide the remote control 10 with favorable operability, which is capable of quickly and easily starting operation of or stopping operation of the air-conditioning apparatus while taking advantage of user-friendliness of the touch panel.

Further, if the display unit turn-on button 7 is depressed while display of the display unit 3b is turned on, because the remote control 10 turns off the display unit 3b and turns off energization of the touch panel 3a, it is possible to further save power and extend the length of the battery life.

Embodiment 3

Figure 12:
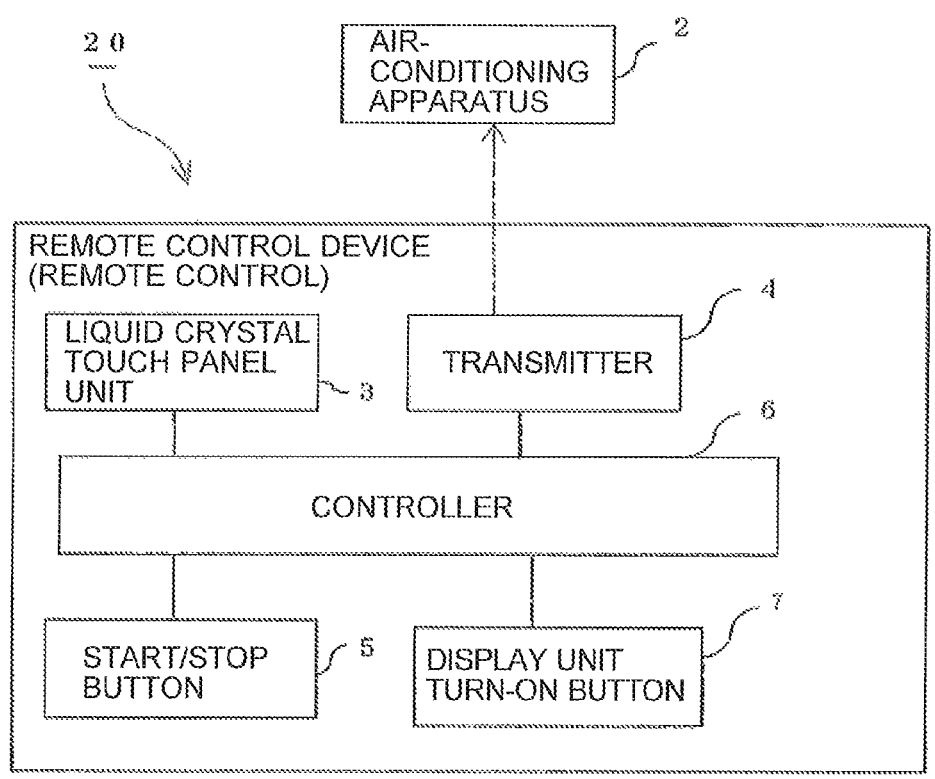
FIG. 12 is a block diagram illustrating a remote control device for an air-conditioning apparatus according to Embodiment 3 of the present invention.
Figure 13:
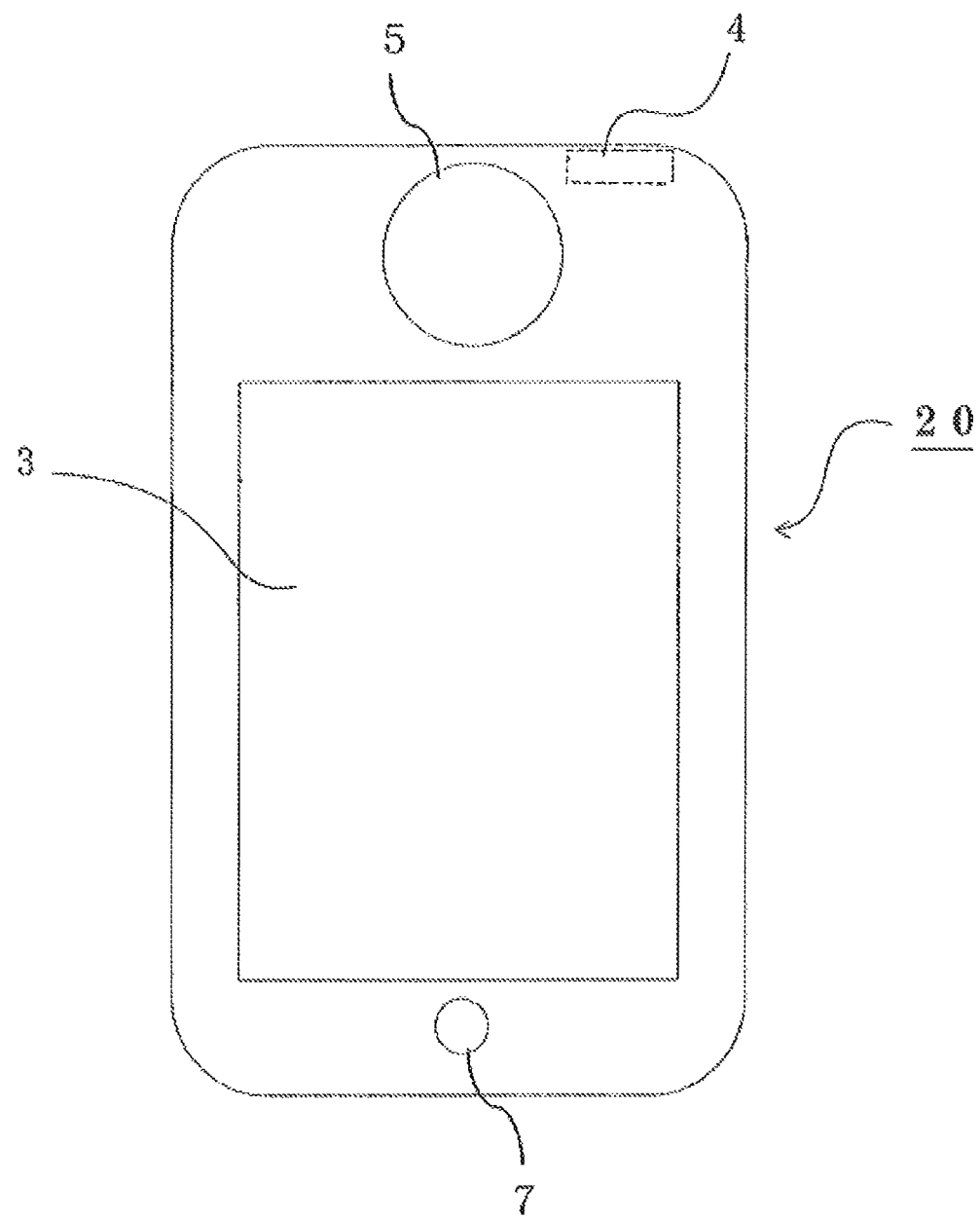
FIG. 13 is a top view illustrating the remote control device for the air-conditioning apparatus according to Embodiment 3 of the present invention.

FIG. 12 is a block diagram illustrating a remote control device 20 for an air-conditioning apparatus according to Embodiment 3 of the present invention, and FIG. 13 is a top view illustrating the remote control device 20 (hereinafter, referred to as a remote control 20). Parts assigned with the same reference numerals as those in Embodiment 1 and Embodiment 2 indicate the same or corresponding parts.

The remote control 20 according to Embodiment 3 has the start/stop button 5 at a position different from the liquid crystal touch panel unit 3 and further has the display unit turn-on button 7 at a position different from the liquid crystal touch panel unit 3 and the start/stop button 5. A signal indicating that the user depresses the start/stop button 5 and the display unit turn-on button 7 is detected at the controller 6.

As with Embodiment 2, also in this embodiment, turning on and turning off of the liquid crystal display unit 3b of the liquid crystal touch panel unit 3 and turning on and off of energization of the touch panel 3a are performed in conjunction with each other. Also here, "the liquid crystal touch panel unit 3 turned off" means that the liquid crystal display unit 3b of the liquid crystal touch panel unit 3 is turned off and energization of the touch panel 3a is turned off. Further, "the liquid crystal touch panel unit 3 being turned on" means that the liquid crystal display unit 3b of the liquid crystal touch panel unit 3 is turned on and the touch panel 3a is turned on by being energized.

Operation when the user depresses the start/stop button 5 is the same as that in FIG. 4 described in Embodiment 1. The user starts operation of or stops operation of the air-conditioning apparatus 2 only by depressing the start/stop button 5 when the air-conditioning apparatus 2 is operating or not operating. In this manner, starting operation of/off the air-conditioning apparatus 2 which is most frequently operated can be operated quickly and easily with the start/stop button 5.

It should be noted that it is also possible to turn on the liquid crystal touch panel unit 3 to display the state of settings or the control command on the liquid crystal display unit 3b at the same time as processing of starting operation of or stopping operation of the air-conditioning apparatus 2 when the start/stop button 5 is depressed. The operation at this time is the same as that in FIG. 5.

As described in Embodiment 1, if the liquid crystal touch panel unit 3 is turned on to display the state of settings or the control command at the liquid crystal display unit 3b at the same time as the start/stop button 5 being depressed, the user can perform further various control, so that it is possible to improve operability. Particularly, by displaying the state of settings such as a temperature and a direction of the airflow and providing display for changing the state of settings when the air-conditioning apparatus 2 is activated, the user can confirm or change the state of settings during operation. In this manner, it is possible to provide the remote control 20 with favorable operability which can quickly respond to a request of the user.

Figure 14:
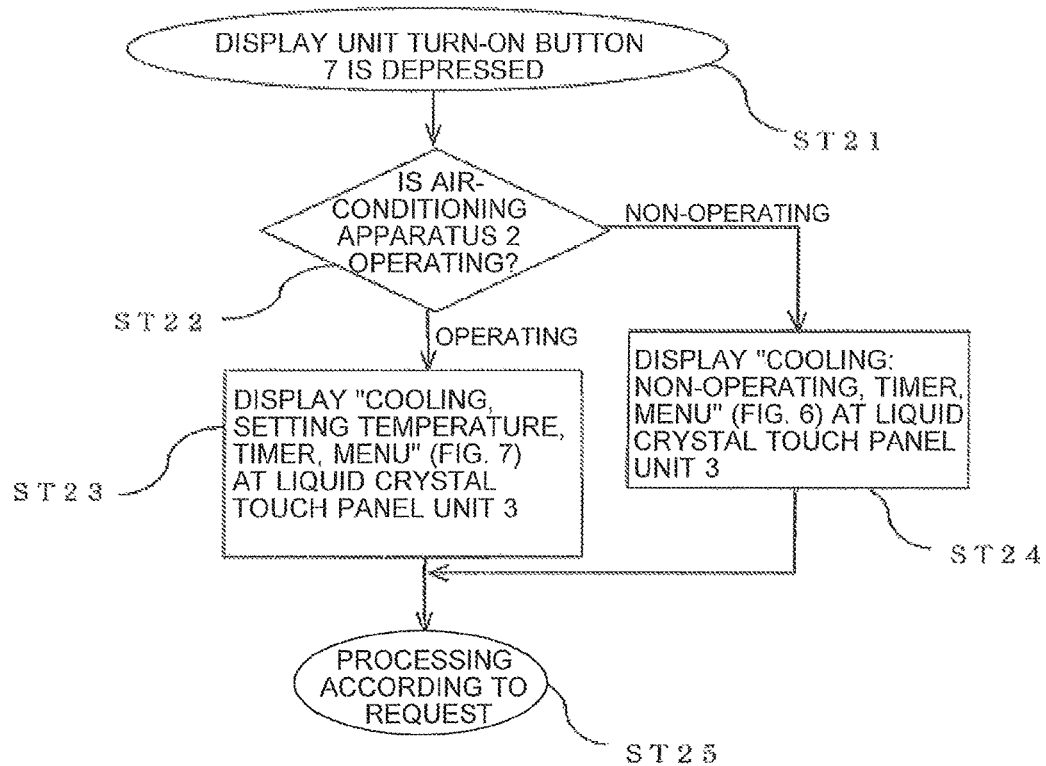
FIG. 14 is a chart illustrating flow of operation of the remote control device for the air-conditioning apparatus according to Embodiment 3 of the present invention.

An example of operation of the controller 6 when the user depresses the display unit turn-on button 7 is illustrated in a chart of FIG. 14. In this embodiment, when the operation of the air-conditioning apparatus 2 is started or stopped, the start/stop button 5 is depressed. Meanwhile, when the user desires to change the state of settings instead of starting operation of or stopping operation of the air-conditioning apparatus 2 while the liquid crystal touch panel unit 3 is turned off, the user tries to turn on the liquid crystal touch panel unit 3 by depressing the display unit turn-on button 7.

In FIG. 14, when the controller 6 detects that the display unit turn-on button 7 is depressed in ST21, the controller 6 determines whether or not the operation of the air-conditioning apparatus 2 is being started (ST22). If the operation of the air-conditioning apparatus 2 is being started, the liquid crystal touch panel unit 3 is turned on, and display of, for example, "air-conditioning, 26 degrees C. (state of settings)" or "timer, menu (control command)" is provided on the liquid crystal display unit 3b as illustrated in FIG. 7 (ST23). If the touch panel 3a has not been touched for a certain period (for example, approximately 30 seconds) in response to this display, the liquid crystal touch panel unit 3 is turned off. Further, processing according to the control requested by the user is performed (ST25), for example, if the user touches the "timer", timer setting is performed, and if the "menu" is touched, the display shifts to other liquid crystal display menu for changing a temperature, a direction of the airflow, or the like.

When it is determined in ST22 that the air-conditioning apparatus 2 is not operating, the liquid crystal touch panel unit 3 is turned on, and display of, for example, "air-conditioning apparatus not operating (state of settings)" or "timer, menu (control command)" is provided on the liquid crystal display unit 3b as illustrated in FIG. 6 (ST24). If the touch panel 3a has not been touched for a certain period (for example, 30 seconds) in response to this display, the liquid crystal touch panel unit 3 is turned off. Further, processing according to control requested by the user is performed (ST25), for example, if the user touches the "timer", timer setting is performed, or if the "menu" is touched, the display shifts to other liquid crystal display menu for notifying the user of consumed power, or the like.

When the state of settings such as the setting temperature and a direction of the airflow is changed while the operation of the air-conditioning apparatus 2 is being started, the user first depresses the display unit turn-on button 7 to turn on the liquid crystal touch panel unit 3. The user then touches the control command displayed on the liquid crystal display unit 3b through the touch panel 3a to change the state of settings of the air-conditioning apparatus 2. Of course, it is possible to start control such as changing setting or confirming consumed power, immediately after depressing the display unit turn-on button 7 to turn on the liquid crystal touch panel unit 3 even when the air-conditioning apparatus 2 is not operating.

The display of the state of settings or the control command displayed on the liquid crystal display unit 3b (FIG. 6 or FIG. 7) or layout of the display is merely an example, and is not limited to this example. Further, the operation performed when the display unit turn-on button 7 is depressed is not limited to that in FIG. 14. For example, it is also possible to store the display provided before the liquid crystal touch panel unit 3 is turned off and provide the stored display again.

Because the display unit turn-on button 7 is provided, it is possible to save power by reducing power consumed at the touch panel 3a and the liquid crystal display unit 3b when the remote control 20 is not being manipulated. It is therefore possible to extend the length of the life of the battery for driving the remote control 20.

It should be noted that, in order to further improve operability of the remote control 20, the start/stop button 5 and the display unit turn-on button 7 may have a noticeable color. For example, the start/stop button 5 and the display unit turn-on button 7 may have a noticeable color such as yellow and orange or fluorescent color while the remote control 20 may have muted color such as white, black and gray. At this time, instead of the start/stop button 5 having the same color as color of the display unit turn-on button 7, if the display unit turn-on button 7 has color of orange or red which is suggestive of light while the start/stop button 5 has another a noticeable color, visibility of the two buttons 5 and 7 is improved.

Further, as illustrated in FIG. 13, the start/stop button 5 and the display unit turn-on button 7 may be respectively disposed at an upper side and at a lower side of the liquid crystal touch panel unit 3, and the start/stop button 5 may have a size different from the sizes of the display unit turn-on button 7. If the sizes of the buttons 5 and 7 are made obviously different, visibility of the start/stop button 5 and the display unit turn-on button 7 is improved. By improving the visibility of the buttons 5 and 7, it is possible to prevent erroneous control, for example, a case where when the user tries to change the state of settings while the operation of the air-conditioning apparatus 2 is being started, the user erroneously depresses the start/stop button 5 and stops operation of the air-conditioning apparatus 2, so that it is possible to improve operability of the remote control 20 by the user. Particularly, because it takes approximately one minute to start operation of or stop operation of the air-conditioning apparatus 2, if, for example, the user erroneously depresses the start/stop button 5 while the operation of the air-conditioning apparatus 2 is being started and stops operation of the air-conditioning apparatus 2, it takes several minutes to restore the air-conditioning apparatus 2. To minimize such erroneous control, it is desirable that the start/stop button 5 is made more striking than the display unit turn-on button 7 to improve visibility of the start/stop button 5.

Further, as with Embodiment 2, the display unit turn-on button 7 may also have a function of turning off the liquid crystal touch panel unit 3 if the display unit turn-on button 7 is depressed while the liquid crystal touch panel unit 3 is being turned on. That is, if the display unit turn-on button 7 is depressed while the liquid crystal touch panel unit 3 is being turned on, the display of the liquid crystal display unit 3b may be turned off and energization of the touch panel 3a may be turned off. If the display unit turn-on button 7 also has a function of turning off the liquid crystal touch panel unit 3, it is possible to purposely turn off the liquid crystal display unit 3b to save power before a predetermined period (for example, approximately 30 seconds) has elapsed after liquid crystal display, so that it is possible to further save power.

Meanwhile, there is a possibility that the user may erroneously depress the liquid crystal touch panel unit 3. To address this, the liquid crystal touch panel unit 3 may be kept turned on if the display unit turn-on button 7 is depressed while the liquid crystal touch panel unit 3 is being turned on.

With the remote control 20 according to Embodiment 3, main control input is operated at the liquid crystal touch panel unit 3, and the remote control 20 includes the start/stop button 5 for starting operation of or stopping operation of the air-conditioning apparatus 2 and the display unit turn-on button 7 for turning on or off the liquid crystal touch panel unit 3. It is therefore possible to quickly and easily start operation of or stop operation of the air-conditioning apparatus 2 while taking advantage of manipulation through the touch panel 3b and save power. Further, because the remote control 20 only has the liquid crystal touch panel unit 3 and two buttons 5 and 7, the remote control 20 has simpler configuration than that of a remote control with a number of buttons, so that the user can easily and quickly manipulate the remote control 20.

As described above, because the remote control 20 of this embodiment includes a flat, plate-like display 3b which displays a state of settings of the air-conditioning apparatus 2 or a control command, a touch panel 3a which is provided on or under the display unit 3b and through which a control command for the air-conditioning apparatus 2 is input in response to a change in an electric signal detected when a display position of the display unit 3b is touched, a transmitter 4 which transmits a signal of the control command input through the touch panel 3a to the air-conditioning apparatus 2, a start/stop button 5 which is provided at a position different from the touch panel 3a and triggering start or stop of operation of the air-conditioning apparatus 2, and a display unit turn-on button 7 which is provided at a position different from the touch panel 3a and the start/stop button 5 and which turns on the display unit, it is possible to provide a remote control device for an air-conditioning apparatus with favorable operability which is capable of quickly and easily starting operation of or stopping operation of the air-conditioning apparatus while taking advantage of user-friendliness of the touch panel, and extending the length of the battery life.

Further, the remote control 20 turns off the display unit 3b and turns off energization of the touch panel 3a if the touch panel 3a has not been touched for a predetermined period after the state of settings of the air-conditioning apparatus 2 or the control command was displayed on the display unit 3b, so that it is possible to save power required for liquid crystal display and save power required for energizing the touch panel 3a and extend the length of the battery life.

Further, the remote control 20 starts operation of or stops operation of the air-conditioning apparatus 2, turns on the display unit 3b and turns on energization of the touch panel 3a if the start/stop button 5 is depressed while display of the display unit 3b is turned off, so that it is possible to provide a remote control device with favorable operability which is capable of quickly and easily starting operation of or stopping operation of the air-conditioning apparatus and, further, promptly responding to control requested by the user.

Further, the remote control 20 turns off the display unit 3b and turns off energization of the touch panel 3a if the display unit turn-on button 7 is depressed while display of the display unit 3b is turned on, so that it is possible to further save power and extend the length of the battery life.

REFERENCE SIGNS LIST 1 remote control device (remote control) 2 air-conditioning apparatus 3 liquid crystal touch panel unit 3a touch panel 3b liquid crystal display unit 4 transmitter 5 start/stop button 6 controller 7 display unit turn-on button 10 remote control device (remote control) 20 remote control device (remote control)

The invention claimed is:

1. A remote control device for an air-conditioning apparatus, the remote control device comprising:
   a flat, plate-like display to display a state of settings of the air-conditioning apparatus or a control command;
   a touch panel provided on or under the display to receive input of a control command for the air-conditioning apparatus through detection of a change in an electric signal, the change occurring when a display position of the display is touched;
   a transmitter to transmit to the air-conditioning apparatus a signal of the control command input through the touch panel; and
   a start/stop button provided at a position different from the touch panel and configured to trigger start of operation of or stop of operation of the air-conditioning apparatus, wherein:
   where the touch panel is not touched for a predetermined period after the state of settings of the air-conditioning apparatus or the control command is displayed on the display, the display is turned off,
   when the start/stop button is depressed while the display is turned off and the air-conditioning apparatus is in operation, the operation of the air-conditioning apparatus is stopped, and the state of settings and the control command are displayed on the display, and
   when the start/stop button is depressed while the display is turned off and the air-conditioning apparatus is stopped, the operation of the air-conditioning apparatus is started and the state of settings and the control command are displayed on the display.

2. A remote control device for an air-conditioning apparatus, the remote control device comprising:
   a flat, plate-like display to display a state of settings of an air-conditioning apparatus or a control command;
   a touch panel provided on or under the display to receive input of a control command for the air-conditioning apparatus through detection of a change in an electric signal, the change occurring when a display position of the display is touched;
   a transmitter to transmit to the air-conditioning apparatus a signal of the control command input through the touch panel; and
   a display turn-on button provided at a position different from the touch panel and triggering turning on the display, wherein
   where the touch panel is not touched for a predetermined period after the state of settings of the air-conditioning apparatus or the control command is displayed on the display, the display is turned off and energization of the touch panel is turned off,
   where the display turn-on button is depressed while the display is turned off, a control command for starting operation of or stopping operation of the air-conditioning apparatus is displayed on the display, and energization of the touch panel is turned on,
   when the control command for starting operation of or stopping operation of the air-conditioning apparatus displayed on the display is operated while the air-conditioning apparatus is in operation, the operation of the air-conditioning apparatus is stopped, and the state of settings and the control command are displayed on the display, and
   when the control command for starting operation of or stopping operation of the air-conditioning apparatus displayed on the display is operated while the air-conditioning apparatus is stopped, the operation of the air-conditioning apparatus is started and the state of settings and the control command are displayed on the display.

3. The remote control device for an air-conditioning apparatus of claim 1, further comprising
   a display turn-on button provided at a position different from the touch panel and the start/stop button and triggering turning on the display.

4. The remote control device of claim 3, wherein
   where the touch panel is not touched for a predetermined period after the state of settings of the air-conditioning apparatus or the control command is displayed on the display, the display is turned off and energization of the touch panel is turned off.

5. The remote control device of claim 4, wherein
   where the start/stop button is depressed while the display is turned off, the operation of the air-conditioning apparatus is started or stopped, the display is turned on, and energization of the touch panel is turned on.

6. The remote control device of claim 2, wherein
   where the display turn-on button is depressed while the display is turned on, the display is turned off, and energization of the touch panel is turned off.

7. The remote control device of claim 1, wherein the remote control device is fed by a battery.

* * * * *